UNITED STATES PATENT OFFICE.

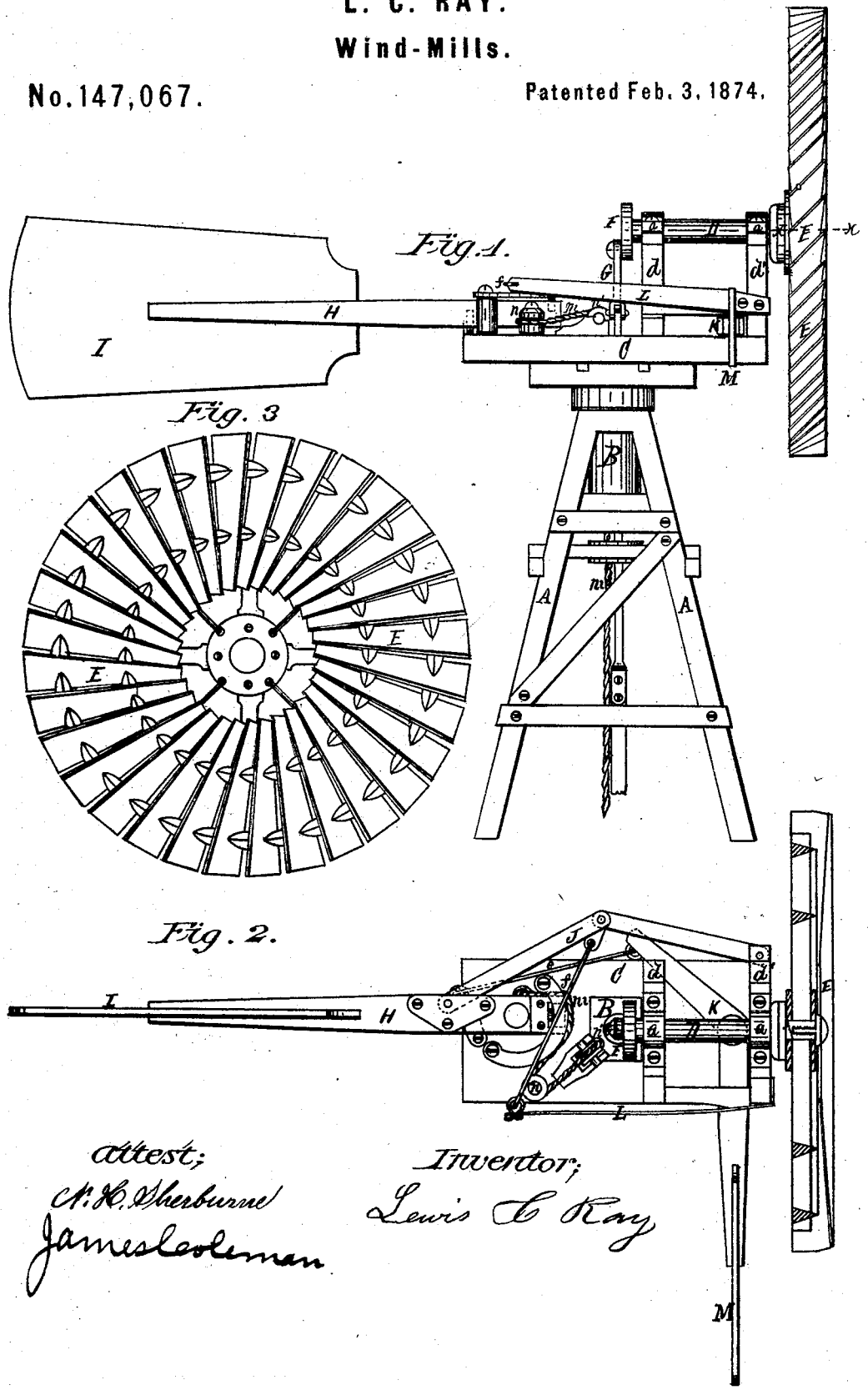

LEWIS C. RAY, OF MARYVILLE, MISSOURI, ASSIGNOR TO HENRY MILLER, OF CORNING, IOWA.

IMPROVEMENT IN WINDMILLS.

Specification forming part of Letters Patent No. 147,067, dated February 3, 1874; application filed June 23, 1873.

*To all whom it may concern:*

Be it known that I, LEWIS C. RAY, of Maryville, in the county of Nodaway, in the State of Missouri, have invented a certain new and useful Improvement in Windmills; and do hereby declare the following to be a full, clear, and exact description thereof, which will enable others skilled in the art to which my invention appertains to make and use the same, reference being had to the accompanying drawings forming part of this specification, in which—

Figure 1 is a side elevation of a windmill embodying my said improvement. Fig. 2 is a top view of the same, cutting the fans on the line *x x* drawn through Fig. 1; and Fig. 3 is a front view of the fans detached.

Similar letters of reference indicate like parts in the several figures of the drawings.

My invention has for its object to provide a self-governing windmill; and to that end it consists in the combination, with a flexible main vane and primary side vane, of a jointed lever, spring, and connecting-rods, all so arranged as to determine the angle of the fans to the wind, whereby the velocity of motion is controlled.

In the drawing, A represents the framework, which is substantially made as shown; or may be in any suitable form that will receive the moving parts of the machine. B is a vertical shaft, which is secured within the upper end of the frame, and is so arranged as to admit of a revolving movement. C is a platform, which is permanently attached to the upper end of said shaft, and arranged to revolve therewith. D is the main or driving shaft. This shaft is secured within boxes *a a* attached to or secured upon uprights *a' a'* permanently affixed to the upper surface of the platform upon the outer end of this shaft. The fans E are secured in the usual manner. F is a crank-wheel, which is affixed to the inner end of the main shaft in the ordinary manner. G is a pitman, which is attached or connected to the wrist-pin of the crank, and extends downward through shaft B, the latter being hollow, to admit of the same. This pitman is attached, at its lower end, to the machinery to be driven in the ordinary manner, and by which the requisite motion is imparted thereto by the rotation of shaft D. H is a horizontal arm, which is pivoted to the upper surface of the platform, and extends backward in a line with shaft D, and is so arranged as to freely turn upon its pivot. Within the outer end of this arm is secured the main vane I, in the ordinary manner. Pivoted to the side of said arm is a connecting-rod, *e*, which extends backward to, and is connected with, a horizontal arm, K. This arm is pivoted to the upper surface of the platform, and extends transversely across the same, and is so arranged that as its outer end is forced backward arm H is moved upon its pivot, turning the same to an obtuse angle to the line of shaft D. Pivoted to said arm H, at or near its point of connection with rod *e*, is a jointed lever, J, which extends backward to upright *a'*, and is pivoted thereto. Attached to said lever, at its center or joint, is a connecting-rod, *f*, which extends transversely across the platform, and is permanently secured to the end of a horizontal spring, L. This spring extends forward, and is firmly secured to upright *a'*, as shown in Fig. 2. Firmly secured to the outer end of arm K is a primary vane, M, which is so arranged as to be in a line parallel to the face of the fans. The arm supporting this vane is so arranged that as the pressure of wind against the vane exceeds the limit required the outer end of the arm is moved backward, and, by means of connecting-rod *e*, arm H is turned upon its center to an obtuse angle to the main shaft, thereby changing the position or angle of the fans, which reduces the pressure of wind thereon; and as the pressure of wind decreases, the said arm H is forced back to its normal position by the action of spring L, consequently turning the fans back to their former position, thereby insuring a uniform velocity of motion. Firmly secured to the inner end of arm H is a cord, *m*, which passes around a sheave-wheel, *n*, which is pivoted to the upper surface of the platform. The said cord passes over a like wheel, *n'*, and downward through shaft B, as shown in Fig. 1, the object of which is to change the position of the main vane, by which the faces of the fans are turned from contact with the wind when not in use.

Having thus described my invention, I claim—

In combination with the flexible main vane I and primary side vane M, and their respective arms H and K, of the jointed levers J, connecting-rods $e$ and $f$, and spring L, as specified.

The above specification of my invention signed by me this 16th day of June, A. D. 1873.

LEWIS C. RAY.

Witnesses:
JAMES COLEMAN,
N. H. SHERBURNE.